H. W. LAWRENCE.

LAMP RECEPTACLE.

APPLICATION FILED AUG. 26, 1909.

Reissued Oct. 11, 1910. 13,157.

*Witnesses:*
E. Daniels
C. H. Potter.

*Inventor:*
Harry W. Lawrence,
by Byrnes, Townsend & Brickenstein,
Att'ys

THE NORRIS PETERS CO., WASHINGTON, D. C.

UNITED STATES PATENT OFFICE.

HARRY WALLACE LAWRENCE, OF DENVER, COLORADO, ASSIGNOR TO THE NEW ENGLAND ELECTRIC CO., A CORPORATION OF COLORADO.

LAMP-RECEPTACLE.

13,157. Specification of Reissued Letters Patent. Reissued Oct. 11, 1910.

Original No. 864,427, dated August 27, 1907, Serial No. 350,916. Application for reissue filed August 26, 1909. Serial No. 514,828.

*To all whom it may concern:*

Be it known that I, HARRY WALLACE LAWRENCE, a citizen of the United States, residing at Denver, in the county of Denver and State of Colorado, have invented certain new and useful Improvements in Lamp-Receptacles, of which the following is a full, clear, and exact description.

My invention relates to lamp receptacles, particularly of that type having a sheet metal threaded shell supported by a porcelain base, and adapted for use on moldings, ceilings, walls, and conduits.

In one of its aspects the invention consists of a porcelain base having a face with channels or cavities therein adapted to receive the circuit wires in a plane sufficiently removed from the ceiling or supporting surface and having a threaded shell which projects from the face, and which is adapted to receive a compact and ornamental cover plate, such cover plate being adapted to wholly inclose and insulate the threaded shell.

In another aspect the invention consists in the arrangement by which the threaded shell is efficiently secured in place and angularly positioned in the base and at the same time very efficiently insulated from the central stud contact.

The invention still further consists in the features of construction and combination as hereinafter set forth and claimed.

Figure 1:
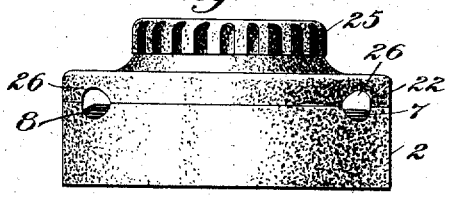
Figure 2:
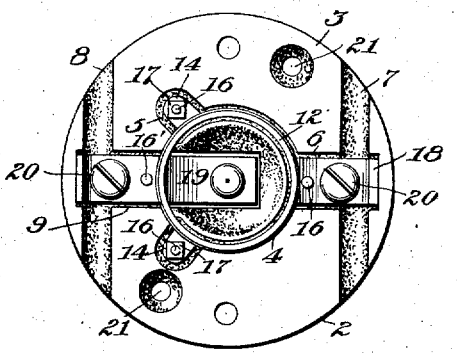
Figure 3:
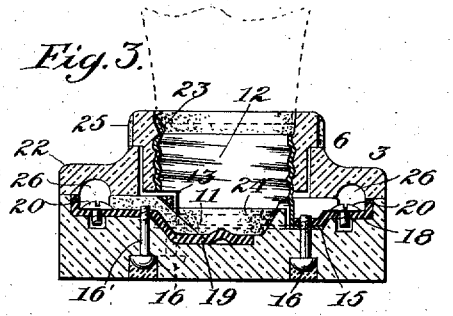
Figure 4:
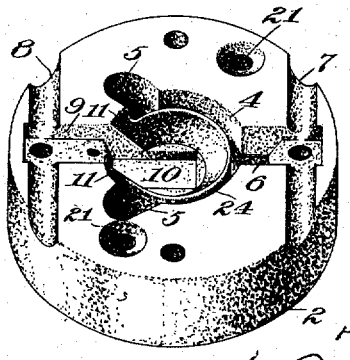

In the drawings: Figure 1 is a side view of a receptacle; Fig. 2 is a top view of the same with the cover plate removed; Fig. 3 is a vertical sectional view; Fig. 4 is a perspective view showing the porcelain base.

In the molding and cleat wiring, the circuit wires are ordinarily carried upon the supporting wall or surface at a predetermined distance of separation therefrom, in order to avoid danger of fires, and to comply with the insurance regulations.

The receptacles are ordinarily made of porcelain, and are adapted to receive the circuit wires and establish connections therefrom to an incandescent lamp. It is highly desirable that no metallic parts which are in connection with the power circuit be exposed at any point, partly on account of the danger of fire, as above stated, and partly on account of the liability of injurious shocks to persons touching the lamp for any purpose. In other words, it is desirable to have the porcelain of the receptacle entirely surround and inclose the usual metallic sleeve contact of the lamp. In carrying out my invention I aim to obtain this result, and at the same time obtain a receptacle which is extremely compact and ornamental in appearance, and not more projecting from the surface on which it is supported than receptacles hitherto used.

Referring to the drawings in which like parts are designated by the same reference sign, 1 indicates a lamp receptacle, having a base 2, of porcelain or suitable insulating material. The upper face of the base 2 is conveniently made flat, as shown at 3, and is recessed with certain grooves for the circuit wires and cavities in which all of the metallic parts are inset and arranged. The thickness of the base is sufficient for the purposes of strength and durability and also to properly space and retain the circuit wires the requisite distance from the wall or supporting surface on which they run.

4 indicates an annular cavity or groove extending inward from the flat face 3. This groove is quite deep and narrow and does not extend through a complete circle or circumference, but only through about $\frac{3}{4}$ or $\frac{7}{8}$ thereof, as clearly shown in Fig. 4. 5 indicates extensions of this annular groove or channel respectively located near the ends thereof, and 6 is another extension half-way between the extensions 5. The various extensions 5 and 6 are conveniently disposed at equal angular distances from one another.

7 and 8 denote a pair of parallel channels or grooves extending across the face 3 of the base. The channel 7 communicates with the extension 6 of the annular groove 4, and the channel 8 communicates by a passage 9 with a central depression 10, at the middle of the space surrounded by the annular groove 4. The depression 10 is concaved or rounded inwardly to a curvature or shape corresponding to the curvature of the butt end of an ordinary incandescent lamp. It is also made quite deep, so that the central stud terminal later described lies below the plane of the passages which receive the circuit wires. In order to make this possible the passage 9 extends downwardly through the interrupted portion of the annular groove 4, so that walls or partitions 11 are produced, and which separate the passage 9 from the annular groove 4. By this arrangement of having the groove 7 and the central stud terminal in the concave depression 10 the threaded shell is not only separated at all points from the central stud by a wall or barrier, but the screws and fastening means of the threaded shell are still more widely separated from such stud so that there is no possibility of a short circuit. The butt end of the lamp is received so deeply into the base that it is considerably beyond the plane of the passages which contain the circuit wires and this is an important feature of the invention as will later more particularly appear.

The threaded shell is indicated at 12, and is of the full length required for any incandescent lamp. 13 denotes a cut-away portion of the threaded shell and this cut-away portion is formed to fit over the partitions 11, which separate the annular groove 4, from the passage 9. In this way the threaded shell may be inset deeply in the groove 4. Also it will be observed that the cut-away portion 13 serves to accurately position the threaded shell in the proper angular relation during the process of manufacture. At the lower edge of the threaded shell are a plurality of outwardly bent lugs or ears 14, which are adapted to be positioned in the extensions 5 of the annular groove 4. There is also an additional outwardly bent ear 15, which enters the extension 6 of the groove.

16 denotes small machine screws which are passed upward through the base to enter the various ears, and are received in nuts 17, so as to hold the shell in place. The screw 16 which enters the ear 15 is received in a metallic clip 18, which extends outwardly in the passage 6, and into the channel 7. This forms a connection or terminal for the threaded shell. The central stud terminal is formed by a metallic strip or piece 19, which is bent to enter the passage 9, and which extends into the channel 8.

20 are screws in the respective pieces 18 and 19, and which constitute binding posts or screws for the attachment of the circuit wires in the channels 7 and 8. The metallic strip or piece 19 is conveniently held in place by a machine screw 16′.

21 indicates countersunk holes extending through the base and adapted to receive any suitable wood screws by which the receptacle is attached to a molding or in any desired relation.

22 indicates a cover or plate which has a central hole 23, and adapted to be placed over the threaded shell so as to cover up all of the metallic parts and connections. It is evident that this cover plate may be made with a flat lower face if desired and screwed down upon the threaded shell until it is tightly engaged upon the face of the base. I prefer, however, to make use of a small internally threaded bushing 25 which screws down upon the threaded shell, and holds the cover 22 in place. In this relation the cover plate not only serves to inclose all of the metallic parts, but also acts to stiffen and support the projecting part of the threaded shell.

26 denotes grooves in the cover which cooperate to receive the grooves or channels 7 and in the base to receive the circuit wires.

It will be observed that the threaded shell is rigidly supported and is positively prevented from turning with the lamp, not only by the screws 16, but also by the ears 14 and 15, which are held against movement by the cavities in which they are located. The central stud terminal is separated from the threaded shell by the partitions 11, and also by the partition 24, which is formed by the material of the porcelain base adjacent to the annular groove 4. The porcelain base is massive and substantial, which is a great practical advantage, because the brittleness of porcelain renders it desirable to avoid any thin or projecting parts.

The bushing 25 is of the ordinary proportions or standard size usually manufactured, and the threaded shell 12 is of the usual length. But on account of the fact that the depression 10 is so deeply recessed into the base, lying as it does considerably below the plane of the channels, 7, 8, which receive the circuit wires, an incandescent lamp is received very deeply into the receptacle, as shown in dotted lines in Fig. 3. The lamp is received so deeply into the receptacle that the usual metallic sleeve contact enters into the receptacle entirely beyond the edge of the bushing 25. The result is that only the glass bulb of the lamp is exposed outside of the receptacle. This is a great practical advantage, because it prevents shocks, the liability to which in some cases is a very serious danger, particularly with 250 volt circuits, or three-wire circuits, the potential of which is frequently high enough to cause injury to persons sensitive to electric shocks.

What I claim is:—

1. A lamp receptacle comprising a porcelain base or block having an upper face with a pair of grooves or channels to receive circuit wires, said base having a central annular groove between said grooves or channels for the circuit wires, a threaded shell received in said annular groove, said threaded shell having outwardly bent ears, means for securing said ears to the base, and means for making electrical connections from one of said ears to one of the grooves or channels for the circuit wires.

2. A lamp receptacle comprising a porcelain base or block having a central annular groove having less than a complete circumference of annular extent, a threaded shell having a cut away portion and adapted to be inset in said groove, and a metallic strap or piece inset in the base and extending through the interrupted portion of said groove.

3. A lamp receptacle comprising a porcelain base or block having an annular groove therein, said groove having a plurality of outward extensions, and a threaded shell having outwardly bent ears inset in said groove, said ears being received in said extensions.

4. A lamp receptacle comprising a porcelain base or block having a flat upper face and an annular groove of less than a complete circumference of angular extent, a threaded shell having a cut away portion received in said annular groove, the base having a passage extending through the interrupted portion of said groove and having an additional passage leading from the groove at an opposite diametrical point from said first named passage, a metallic strap located in said first named passage and constituting a central stud terminal, and an additional clip located in the last named passage and constituting a shell terminal of the receptacle.

5. A lamp receptacle comprising a porcelain base or block having a flat upper face with an annular groove of less than a complete circumference of angular extent, said groove having radial extensions at a plurality of points, a threaded shell having outwardly bent ears upon its lower edge adapted to be received in said groove and extensions, the shell having a cut away portion corresponding to the interrupted portion of said groove, a passage in the porcelain base extending through the interrupted portion of said groove, a metallic strap within said passage and constituting a central stud terminal, and a metallic clip attached to one of said ears of the shell and constituting a shell terminal.

6. A lamp receptacle comprising a porcelain base or block having a flat upper face with a pair of parallel channels, a central annular groove between said channels, a threaded shell received in said groove, passages extending from said channels toward said groove, and a pair of metallic clips in said channels, one of said clips constituting a central stud terminal, the other of said clips being attached to the threaded shell and constituting a shell terminal.

7. A lamp receptacle comprising a porcelain base or block having a flat upper face with grooves or channels, a threaded shell projecting above the plane of said face, terminals and connections for said threaded shell, and a central stud terminal located wholly below the plane of said grooves or channels, and a cover plate having a hole to fit upon said threaded shell and having a lower face with grooves adapted to coöperate with said grooves or channels.

8. A lamp receptacle comprising an insulating base, a threaded shell adapted to receive an electric light bulb plug, outwardly projecting feet portions on said shell, said base having formed therein depressions to receive said feet.

9. A lamp receptacle comprising an insulating body, an insulating wall formed in said body, a terminal plate extending into said base and surrounded by said wall, a threaded shell having its lower edge surrounding said wall, said shell having outwardly projecting feet portions, and said base having formed therein depressions to receive said feet.

10. A lamp receptacle comprising an insulating body, an insulating wall formed in said body, a terminal plate extending into said base and surrounded by said wall, and a threaded shell having its lower edge surrounding said wall.

In witness whereof, I subscribe my signature, in the presence of two witnesses.

HARRY WALLACE LAWRENCE.

Witnesses:
G. SARGENT ELLIOTT,
ADELLA M. FOWLE.